July 16, 1940.    W. GUIER    2,207,797
CONTROL MECHANISM
Filed Oct. 4, 1937
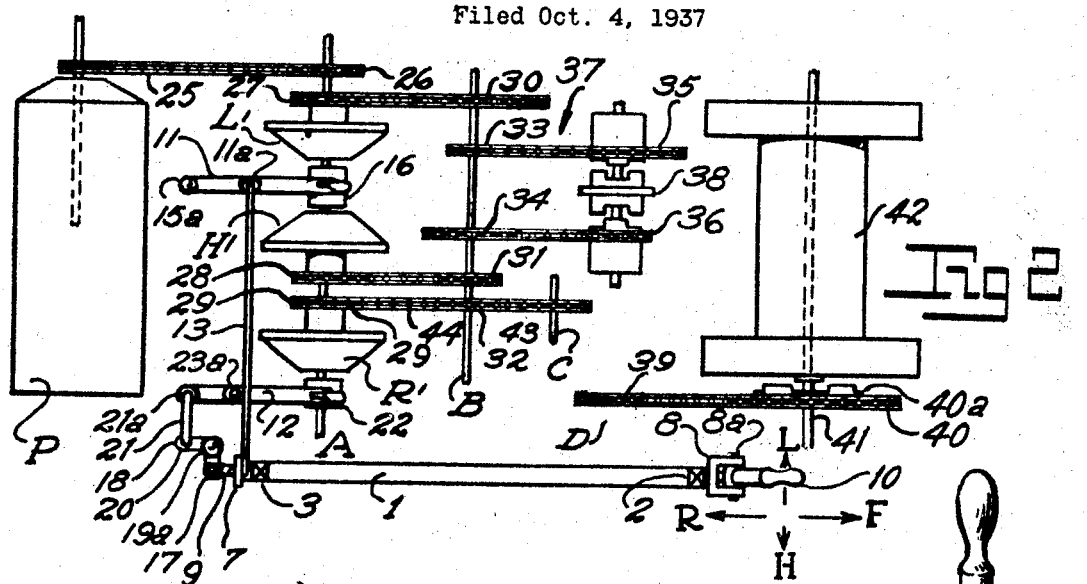
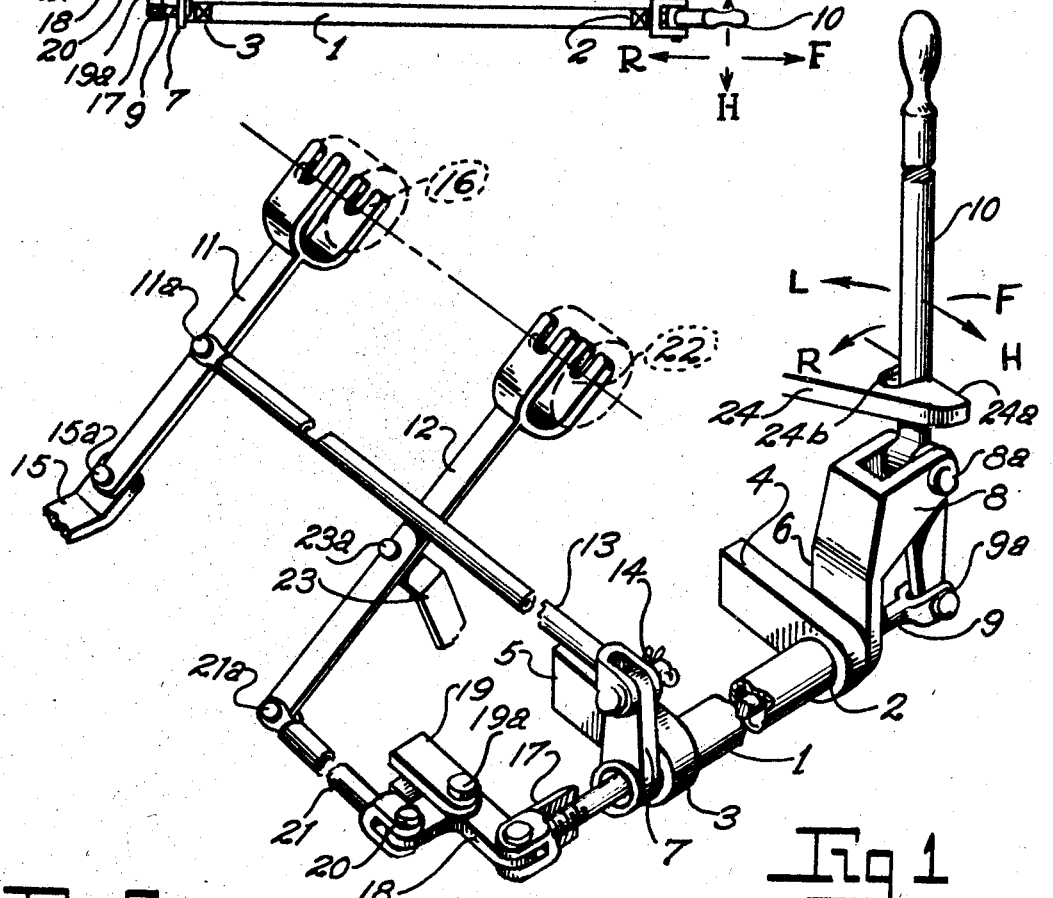
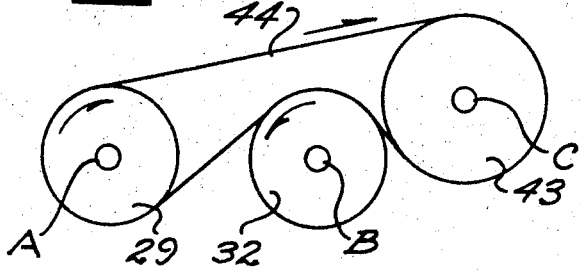
William Guier
INVENTOR
BY
ATTORNEY Patented July 16, 1940

2,207,797

UNITED STATES PATENT OFFICE 2,207,797

CONTROL MECHANISM

William Guier, Tulsa, Okla., assignor to Unit Rig & Equipment Company, Tulsa, Okla., a partnership Application October 4, 1937, Serial No. 167,227

1 Claim. (Cl. 74—217)

This invention relates to control mechanisms and particularly to a control mechanism adapted to operatively control a plurality of machine movements by a single operating member.

A principal object of this invention is to provide a unified control mechanism of maximum flexibility for operating a plurality of machines or machine parts with a minimum amount of effort on the part of the machine operator.

Another object of this invention is to provide a control means capable of a plurality of different movements for operating a plurality of machine parts, all from a single operating position.

Another object is to provide a manually operated control lever which is adapted to control a plurality of separate machine parts.

A specific object is to provide a unified flexible control mechanism for operating a plurality of the power transmission units of a drilling rig.

Other objects and advantages of my new invention will be understood from the following detailed description in conjunction with the accompanying drawing which illustrates one form of apparatus in accordance with my invention.

In the drawing:

Fig. 1 is a perspective view of control mechanism of this invention, having some of the parts thereof broken away for purposes of illustration.

Fig. 2 is a diagrammatic plan view of the power unit of a drilling rig showing the manner of connection thereto of the control mechanism of this invention.

Fig. 3 is a diagrammatic view of the arrangement of shafts, sprockets and belts for reversing the movements of certain parts of the drilling rig.

Referring to the drawing and Fig. 1 in particular, the control mechanism of this invention comprises a tubular shaft 1, which is rotatively mounted in a pair of support bearings 2 and 3 carried by a corresponding pair of fixed supports 4 and 5, respectively. Fixedly attached to opposite ends of shaft 1 and extending radially therefrom are a pair of brackets 6 and 7, respectively. The outer end of bracket 6 is provided with a U shaped yoke 8, extending rearwardly of shaft 1, the space between the arm of the U being substantially in alignment with shaft 1. A rod shaft 9 extends axially through the interior of tubular shaft 1 and beyond the ends thereof. A lever handle 10 is pivotally connected at one end to the end of rod shaft 9 which extends rearwardly of bracket 6 by means of a yoke and pin connection 9a, and lever handle 10 is pivoted at an intermediate point thereof between the arms of yoke 8 by means of a pin 8a which extends through registering openings in handle 10 and the arms of yoke 8. By means of this arrangement, the forward and rearward movement of handle 10 within yoke 8 is adapted to reciprocate rod shaft 9 within tubular shaft 1, while movement of handle 10 to the right or left will rotate shaft 1 in a corresponding direction in bearings 2 and 3. By the described connections between handle 10 and shafts 1 and 9, handle 10 may be utilized for imparting at least four different control movements, namely, a forward and rearward movement by cooperation with rod shaft 9 and right and left hand movements by cooperation with tubular shaft 1.

As an example of a machine in which the described control mechanism may be utilized in controlling a plurality of machine parts, Fig. 1 illustrates apparatus for the operative connection of the control mechanism to a pair of clutch shifting arms 11 and 12 operatively connected to the transmission mechanism of a drilling rig power unit, shown more or less diagrammatically in Fig. 2. A control rod 13 is pivotally connected at one end to the free end of bracket 7 by means of a yoke and pin linkage 14 and the opposite end of rod 13 is pivotally connected to an intermediate point of arm 11 by means of a pin 11a. One end of arm 11 is pivotally connected to a fixed support bracket 15 by means of a pin 15a and the opposite end of arm 11 is operatively engaged with a clutch energizing cone 16. By means of these connections and linkages, movement of handle 10 to the right or left will be transmitted through the corresponding rotative movement of shaft 1 through bracket 6 and thence through rod 13 to arm 11 to produce a shifting of cone 16 in accordance with the direction of movement of handle 10.

The free end of rod shaft 9 is attached to a yoke and pin linkage 17 for pivotal attachment to a bell crank 18 which in turn is pivoted in a fixed support member 19 by means of a pin 19a. The free end of bell crank 18 is pivotally attached by a hinge pin 20 to one end of a second control rod 21, whose opposite end is pivotally connected by means of a pivot pin 21a to the free end of arm 12, the opposite end of which is operatively engaged with a clutch energizing cone 22. Arm 12 is pivotally supported at an intermediate point thereof on a fixed support member 23 by means of a pin 23a. By means of the described linkage between rod shaft 9 and arm 12. forward or rearward movement of handle 10 will reciprocate rod shaft, 9, which will, in turn, impart reciprocating horizontal movements of cone 22. The connection of rod shaft 9 to yoke and pin linkage 17 is adapted to permit free rotation of rod shaft 9 in linkage 17 in order not to interfere with the rotative movement of lever 10 and tubular shaft 1.

The various positions and directions of movement of handle 10 are indicated by the several arrows extending therefrom. Arrows R and F indicate the respective forward and rearward movements of the handle for reciprocating rod shaft 9, while L and H indicate the handle movements when rotating tubular shaft 1.

Handle 10, as it appears in Fig. 1, is shown in the vertical position at which all its connected control rods maintain their respective machine parts in neutral operative position. A fixed guide plate 24 is provided forwardly of handle 9 and having one face 24a adapted to guide the movements of handle 10 in the direction of arrows L and H, and having a slot 24b extending at right angles from face 24a and forwardly thereof for guiding the handle when moved in the direction R. When handle 10 is engaged in slot 24b, no conflicting movement thereof in the directions L or H will, therefore, be possible at the same time.

The power and transmission mechanism of a drilling rig diagrammatically shown in Fig. 2 comprises a prime mover P such as an internal combustion engine, connected by a belt or chain 25 to a sprocket 26 mounted on a power shaft A, on which are mounted a low speed sprocket 27 operatively connected to a clutch L' and a high speed sprocket 28 connected to a clutch H'. Energizing cone 16 is mounted on shaft A and is rovable on shaft A by arm 11 to energize either of the clutches L' and H' depending upon the direction of movement of arm 11, as controlled from lever handle 10. A reversing clutch R', connected to a sprocket 29, is mounted on shaft A, and energizing cone 22 is also mounted on shaft A in operative relationship to clutch R' and is adapted to energize clutch R' upon suitable movement of arm 12 by means of handle 10. A transmission shaft B is mounted parallel to power shaft A and carries sprockets 30, 31 and 32 which are operatively connected by suitable belts or chains to sprockets 27, 28 and 29, respectively. Additional sprockets 33 and 34 are mounted on shaft B intermediate sprockets 30 and 31 and are operatively connected to the low and high speed sprockets 35 and 36, respectively, mounted on a shaft D of a conventional variable speed transmission 37, which is energized in a conventional manner by a double acting clutch 38. A sprocket 39 mounted on one end of shaft D is connected by the usual belt or chain to a sprocket 40 attached to a clutch 40a operatively mounted on a shaft 41 on which is positioned the usual drawworks drum 42. In line with sprocket 32 and on the opposite side thereof with respect to sprocket 29, is a sprocket 43 mounted on an independently supported stub shaft C. Sprocket 43 is connected to both of sprockets 29 and 32 by a belt or chain 44 in the manner shown in Fig. 3, which provides a means for reversing the direction of rotation of shafts B, D and 41 when reversing clutch R' is energized by suitable movement of cone 22.

The described control mechanism of this invention is utilized in controlling the transmission of power in a drilling rig in the following manner:

With the power from prime mover P applied to shaft A through chain 25 and sprocket 26, and with handle 10 initially in its neutral position, transmission of this power in low gear to drawworks drum 42 is made by moving handle 10 to the right in the direction of arrow L. This movement will rotate tubular shaft 1 to the right which will transmit a corresponding movement through bracket 7, and control rod 13 to arm 11 which will pivot about pin 15a and move cone 16 into position for energizing clutch L'. This will energize sprocket 27 and power will be transmitted to shaft B through either of sprockets 33 or 34 to shaft D of transmission 37 through either of sprockets 35 or 36, whichever may be energized by independent operation of clutch 38, and thence through sprocket 39 and the corresponding drive connection to sprocket 40 on drum shaft 41.

Movement of handle 10 in the direction of arrow H will similarly energize clutch H' and transmit the power through its connected train of sprocket and drive connections to drum 42.

If it is desired to reverse the direction of rotation of drum 42, handle 10 is first moved to the neutral position and thence forward in the direction of arrow R. This movement will actuate rod shaft 9 and by means of previously described train of connections, will move cone 22 into position to energize reversing clutch R' which will, in turn, energize sprockets 32 and 43, causing shaft B to rotate in a reverse direction, thereby reversing the direction of rotation of shafts D and 41.

From the foregoing, it will be evident that by the unified control mechanism of this invention, a plurality of different control movements may be effected in the operation of a power transmission mechanism such as the described drilling rig, all by means of a single control lever which may be operated by a machine operator from a single position and with a minimum of effort and movement. Great flexibility in the control of the various parts of a single power transmission unit is thus provided.

It will also be evident that instead of utilizing the unified control mechanism for operating a plurality of controls in a single machine, the mechanism may be utilized in like manner for operating a plurality of different machines.

In the particular example given above, only three of the several various control movements of which the control mechanism of this invention is capable, are utilized. A fourth possible movement in the direction of arrow F may be likewise utilized for a fourth control on a single machine or for operating a fourth machine. Other positions of handle 10, intermediate the neutral position and the position of farthest movement in the directions of any of the arrows, may be utilized for other controls.

Numerous modifications and alterations may be made in the size, form, and arrangement of the various elements of this invention without departing from the scope of the appended claim.

What I claim and desire to secure by Letters Patent is:

In a power transmission device for a drilling rig, a driving shaft, a driven shaft, first and second counter shafts mounted between said driving shaft and said driven shaft, a pair of speed units mounted on said driving shaft and flexibly connected to said first counter shaft, clutches mounted on said driving shaft intermediate said speed units for actuating either as desired, a reversing unit mounted on said driving shaft and operatively connected to said first counter shaft, a separate clutch mounted on said driving shaft for actuating said reversing unit, a pair of secondary speed units flexibly connecting said first and second counter shafts, clutches on said second counter shaft for actuating either of said secondary speed units desired, a drive connection between said second counter shaft and said driven shaft, and a single control lever operatively connected to the clutches on the driving shaft for actuating the speed units and reversing unit mounted on said driving shaft.

WILLIAM GUIER.